United States Patent [19]

Arai

[11] Patent Number: 4,537,381
[45] Date of Patent: Aug. 27, 1985

[54] ENGINE MOUNT

[75] Inventor: Shigeharu Arai, Toyota, Japan

[73] Assignee: Toyota Jidosha Kabushiki Kaisha, Toyota, Japan

[21] Appl. No.: 454,010

[22] Filed: Dec. 28, 1982

[51] Int. Cl.³ ............................................. F16M 13/00
[52] U.S. Cl. ...................................... 248/559; 248/659
[58] Field of Search ............... 248/659, 559, 635, 638, 248/544; 267/141.2

[56] References Cited

U.S. PATENT DOCUMENTS

| | | | |
|---|---|---|---|
| 2,039,007 | 6/1934 | Keller | 248/659 X |
| 2,925,972 | 2/1960 | Sullivan | 248/659 X |
| 3,167,295 | 1/1965 | Grumblatt | 248/635 |
| 4,403,762 | 9/1983 | Cogswell | 248/559 |
| 4,456,213 | 6/1984 | Fukushima | 248/559 |

FOREIGN PATENT DOCUMENTS

| | | | |
|---|---|---|---|
| 1515836 | 1/1968 | France | 248/559 |
| 718953 | 11/1966 | Italy | 248/635 |
| 56-149214 | 11/1981 | Japan | 248/559 |

Primary Examiner—Reinaldo P. Machado
Assistant Examiner—Alvin Chin-Shue
Attorney, Agent, or Firm—Kenyon & Kenyon

[57] ABSTRACT

An engine mount for resiliently connecting an engine to a vehicle body. The engine mount has an isolator and a bracket. The isolator includes an inner tubular member, an outer tubular member, and a resilient member arranged between the inner and the outer tubular members. The outer tubular member is fixedly connected to the bracket, which is fixedly connected to the engine. The inner tubular member is fixedly connected to the vehicle body. A weight member is connected, at a position opposite to the position of connection of the outer tubular member to the bracket, to the outer tubular member via resilient members.

6 Claims, 3 Drawing Figures

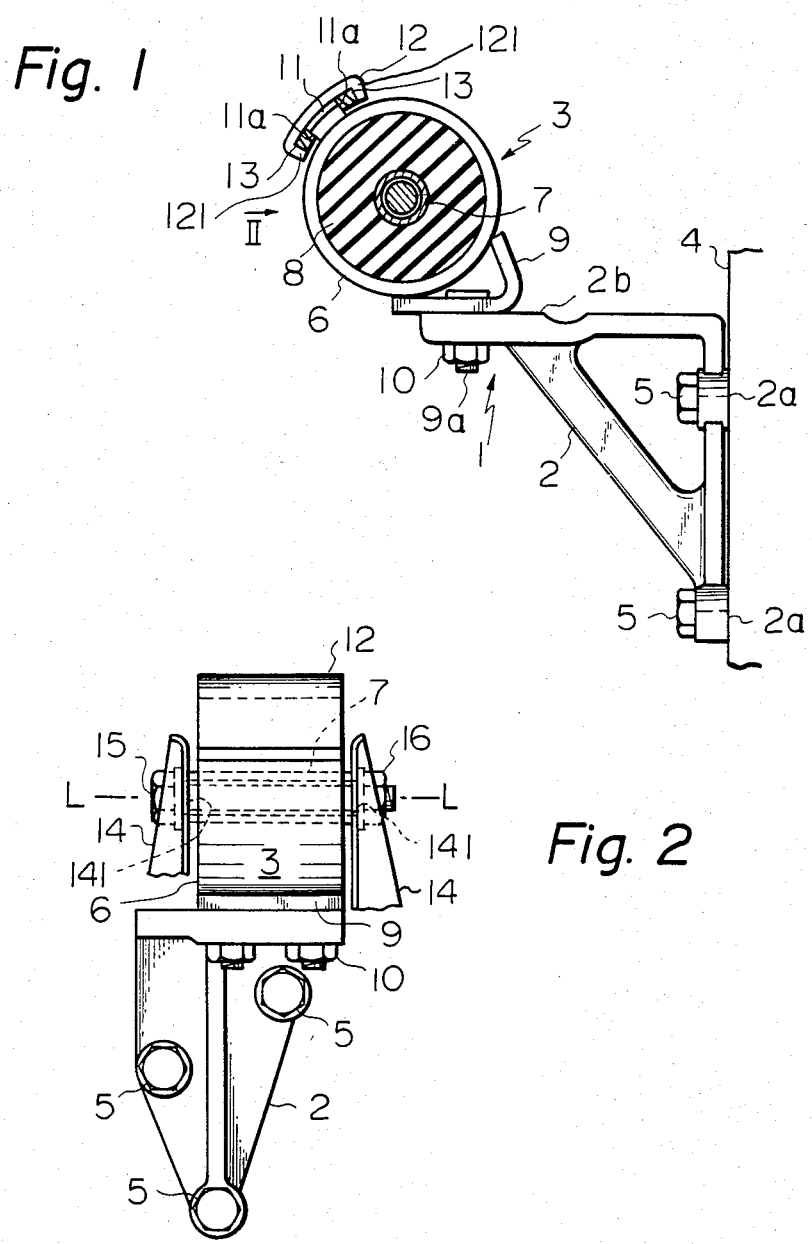

ENGINE MOUNT

BACKGROUND OF THE INVENTION

1. Field of the Invention

The present invention relates to a mount for an engine of an automobile, more particularly to an engine mount of a dynamic damper type.

2. Description of the Prior Art

Mounts for engines of automobiles and the like are generally speaking comprised of brackets and isolators. In conventionally designed engine mounts, the resonant frequency is 200 to 400 Hz. Vibrations of the engine located in this resonant frequency region are amplified by the resonance effect and transmitted to the body of the automobile. This 200 to 400 Hz resonant frequency region, however, leads to drone noise in the automobile body and operational noise in the engine. To suppress such noise, it has heretofore been proposed to stiffen the engine mount to attain a high rigidity thereof and to achieve a resonant frequency of 800 to 1000 Hz, which does not pose a problem in vibrational noise of the body. This solution, however, suffers from the drawback of considerably increasing the mass of the engine mount by that reinforcement.

SUMMARY OF THE INVENTION

An object of the present invention is to provide an engine mount with a resonant frequency outside of the frequency band of 200 to 400 Hz without increasing the total mass.

According to the present invention, an engine mount for connecting an engine to a vehicle body is provided, comprising:

a bracket member having a first surface for connection of the bracket with the engine in a cantilever fashion and a second surface;

an outer tubular member having an axis which is parallel to the second surface;

a first connection means for fixedly connecting the outer tubular member with the second surface of the bracket;

an inner tubular member which is concentric with respect to the outer tubular member;

first resilient member of tubular shape fixedly arranged between the outer tubular member and the inner tubular member;

a second connection means for connecting the inner tubular member with a portion of the vehicle body; and damping means connected to the outer tubular body for achieving resonant frequencies of the mount outside of a predetermined frequency band corresponding to specified types of noises.

BRIEF DESCRIPTION OF THE DRAWINGS

Now an embodiment of the present invention is described with reference to the attached drawings in which:

FIG. 1 is a front elevational view of an engine mount according to the present invention in the state where the engine mount is connected to an engine body, FIG. 2 is a side elevational view of the engine mount taken along an arrow II in FIG. 1.

DESCRIPTION OF THE PREFERRED EMBODIMENTS

Figure 3:
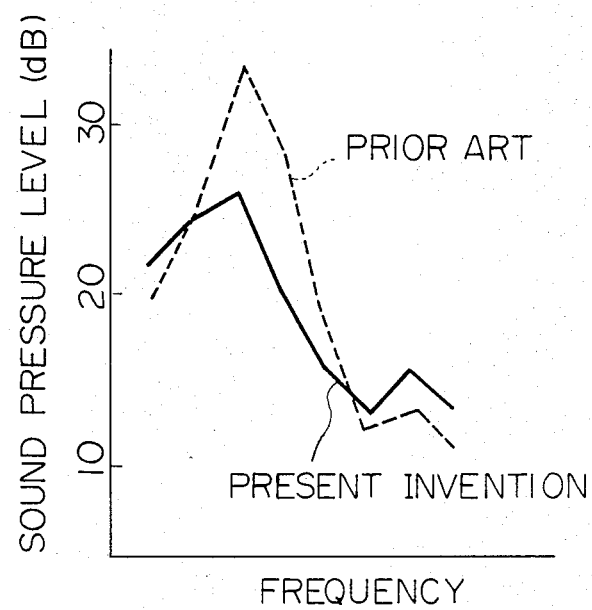
FIG. 3 shows the relationships between the frequency and the sound pressure level of noise in the present invention and in the prior art.

In FIGS. 1 and 2, an engine mount 1 is comprised of a bracket 2 and an isolator 3. The bracket 2 is of a substantially triangular configuration and is, as conventionally, made by casting or from plate material. The bracket 2 is formed with a surface 2a for connection of the bracket to an engine and a surface 2b for connection of the bracket with the isolator 3. These surfaces 2a and 2b are perpendicular to each other. The engine mount 1 is connected to the cylinder block 4 of the engine at the surface 2a by means of mounting bolts 5. In this embodiment, the automobile is of a so-called F—F type. Thus, the engine 4 is arranged transversely with respect to a longitudinal axis of the vehicle, which longitudinal axis is perpendicular to the plane of FIG. 1. A pair of engine mounts, each comprised of the parts 2 and 3, are arranged on the sides of the engine.

Each isolator 3 is comprised of an outer tubular member 6, an inner tubular member 7, a vibration damper 8 made of a rubber material, and a connection piece 9. The connection piece 9 is an angular-shaped member constructed by bending a plate to form an acute angle. The connection piece 9 is fixedly connected on its ends to the outer cylindrical surface of the outer tubular member 6 by welding. The connection piece 9 is fixedly connected at its one side to the supporting surface 2b of the bracket 2 by means of a bolt 9a and a nut 10. The tubular members 6 and 7 are each made as circular cylinders of thin metal and are concentric with each other. The common axis L—L is parallel to the longitudinal axis of the vehicle. The vibration damper 8 is made of a rubber material of a thick cylindrical shape and is arranged between the inner and the outer tubular members 6 and 9. The damper 8 is fused at its outer surface to the inner cylindrical surface of the outer tubular member 6. The damper 8 is fused at its inner surface to the outer cylindrical surface of the inner tubular member 7.

The outer tubular member 6 has, at its outer cylindrical surface, an outwardly directed projection 11 of a predetermined circumferential width, which projection extends along the entire length of the tubular member 6 at a position diametrically opposite to the connection piece 9.

A weight member 12 made of steel material and having a C-shaped cross section extends along the length of the tubular member 6. The member 12 has a pair of circumferentially spaced inwardly directed flange portions 121 between which the projection 11 is arranged. Elongated resilient members 13 of a rectangular cross-sectional shape are arranged between the flange portions and the projection 11. Each of the resilient members 13 is fused to the inner surface of the flange portion 121 and the facing circumferential end surface 11a of the projection 11. In other words, the weight member 12 is resiliently connected to the projection 11 by way of the resilient members 13.

The vehicle body fender apron portions (not shown) have two pairs of body brackets 14, which pairs are located on the sides of the engine. Only one of the pairs is shown in the drawings. The body brackets 14 in one pair are oppositely spaced at a distance equal to the length of the inner tubular member 7. The body brackets 14 have, at their tip ends, mounting holes 141. When the engine mount 1 is connected to the body of the automobile, the inner tubular member 7 of the isolator 3 is arranged between the body brackets 14. Then, a bolt 15 is inserted through the holes 141 of the brackets 14 and the inner tubular member 7, and a nut 16 is screwed to the bolt 15 so as to cause the inner tubular member 7 to be clamped by the sides of the bracket 14.

The above-mentioned construction of an engine mount 1 acts as a dynamic damper when engine vibration takes place along a first plane including a longitudinal axis L—L of an automobile and in a second plane which is perpendicular to the first plane. A value of mass of the weight 12 and a value of the spring coefficient of the resilient members 13 are suitably selected so that the resonant frequencies of the engine mounting 1 are located in regions above and below the frequency band 200 to 400 Hz. Such resonant frequencies pose no problem with regard to vibration noise of the body. In this case, such changes of resonant frequencies are merely determined by the ratio of the value of mass of the weight member 12 to the spring coefficient of the resilient member 13 and are not influenced by the absolute value of the mass of the weight member 12. As a result of this, the increase in the total mass by the incorporation of the weight member 12 and the resilient members 13 can be as small as 100 to 200 g.

FIG. 3 shows the relationships between the frequency and the sound pressure level of noise in an automobile cabin. The solid line corresponds to the present invention, while the dotted line corresponds to the prior art.

In the embodiment shown, in order to resiliently connect the weight member 12 to the outer tubular member 6, the projection 11 on the tubular member 6 and resilient members 13 on the sides of the projection 11 are employed. In place of such parts, other means may be utilized to resiliently connect the weight member to the outer tubular member. For example, a resilient member fixed to the weight member can be directly connected to the outer tubular member.

Many modifications and changes may be made by those skilled in the art without departing from the scope of the present invention.

I claim:

1. An engine mount for connecting an engine to a vehicle body, the engine mount comprising:

a bracket having a first surface for connecting the bracket to the engine in a cantilever fashion and a second surface;

an outer rigid tubular member having an axis which is parallel to the second surface;

a first connection means for fixedly connecting the outer rigid tubular member to the second surface of the bracket;

an inner rigid tubular member which is concentric with respect to the outer rigid tubular member;

a first resilient member of tubular shape fixedly arranged between the outer and the inner rigid tubular members;

a second connection means for connecting the inner rigid tubular member to the vehicle body; and damping means connected to the outer rigid tubular member for achieving resonant frequencies of the mount outside of a predetermined frequency band corresponding to specified types of noises, wherein said damping means comprises a free weight member located at a position opposite to the first connection means and resilient means for connecting the free weight member only to the outer rigid tubular member.

2. An engine mount according to claim 1, wherein said free weight member has a substantially C shaped cross section including a pair of circumferentially spaced inwardly directed flange portions, wherein said outer tubular member has, at a position opposite to the first connection means, an outwardly directed projection which is located between the flange portions of the weight member, and wherein said resilient means comprises resilient pieces fixedly arranged between the projection and the corresponding flange portions.

3. An engine mount according to claim 1, wherein said bracket member has a triangular cross section, said first and second surfaces being provided on adjacent sides of the triangle.

4. An engine mount according to claim 3, wherein said first connection means comprises an angular shaped member having one side fixedly connected to the second surface of said bracket and having ends which are welded to the outer cylindrical surface of the outer rigid tubular member.

5. An engine mount according to claim 1, wherein said second connection means comprises a pair of spaced additional brackets between which the inner rigid tubular member is arranged, said additional brackets being attached to the vehicle body, and fixing means for connecting the inner rigid tubular member to the additional brackets.

6. An engine mount according to claim 5, wherein said fixing means comprises a bolt passed through the inner rigid tubular member and through both of the additional brackets and a nut screwed to one end of the bolt projecting beyond one of the additional brackets.

* * * * *